United States Patent
Goodjohn et al.

(10) Patent No.: US 12,506,632 B2
(45) Date of Patent: Dec. 23, 2025

(54) REAL-TIME TRACKING PROVISION FOR COMMUNICATION DEVICES IN HOUSEHOLD APPLIANCES

(71) Applicant: Haier US Appliance Solutions, Inc., Wilmington, DE (US)

(72) Inventors: Paul Goodjohn, Crestwood, KY (US); Cheikh Tine, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 66 days.

(21) Appl. No.: 18/478,558

(22) Filed: Sep. 29, 2023

(65) Prior Publication Data

US 2025/0112801 A1  Apr. 3, 2025

(51) Int. Cl.
 *H04L 12/28* (2006.01)
(52) U.S. Cl.
 CPC ...... *H04L 12/2807* (2013.01); *H04L 12/2818* (2013.01); *H04L 2012/285* (2013.01)
(58) Field of Classification Search
 CPC ......... G06F 1/04; G06F 1/14; H04L 12/2807; H04L 12/2818; H04L 2012/285
 See application file for complete search history.

(56) References Cited

U.S. PATENT DOCUMENTS

| 6,577,231 | B2 | 6/2003 | Litwin, Jr. et al. | |
|---|---|---|---|---|
| 10,985,607 | B1* | 4/2021 | Silva | H02J 9/062 |
| 2002/0069299 | A1* | 6/2002 | Rosener | H04L 9/40 |
| | | | | 709/248 |
| 2005/0120012 | A1* | 6/2005 | Poth | G05B 19/0428 |
| 2010/0187219 | A1* | 7/2010 | Besore | H02J 13/00004 |
| | | | | 392/441 |
| 2021/0294377 | A1* | 9/2021 | Mickelsen | G06F 1/06 |

FOREIGN PATENT DOCUMENTS

| CN | 202835822 U | 3/2013 |
|---|---|---|
| CN | 203163270 U | 8/2013 |
| CN | 207661994 U | 7/2018 |
| CN | 215067909 U | 12/2021 |
| DE | 102012207444 B4 | 2/2020 |

* cited by examiner

*Primary Examiner* — Caroline H Jahnige
(74) *Attorney, Agent, or Firm* — Dority & Manning, P.A.

(57) ABSTRACT

A communication system for an appliance is provided. The communication system includes a modular communication device, a clock device, and a controller operably coupled to the modular communication device and the clock device. The modular communication device is operable to communicate with a remote server over a communication and is configured to receive demand response signals from the remote server. The clock device is configured to perform clock estimation operations to estimate a true time for the communication system. The clock device includes a real-time clock chip and a low voltage direct-current (DC) power supply that is configured to supply low voltage power signals to the real-time clock chip based at least in part on an operating condition of the appliance. The controller is configured to operate the appliance based at least in part on the demand response signals received over the communication network.

18 Claims, 8 Drawing Sheets

REAL-TIME TRACKING PROVISION FOR COMMUNICATION DEVICES IN HOUSEHOLD APPLIANCES

FIELD

Example aspects of the present disclosure relate generally to household appliances, such as water heaters, and, more particularly, to communication systems for household appliances.

BACKGROUND

Household appliances (e.g., a washer and/or dryer, water heater appliances, air conditioner appliances, kitchen appliances, etc.) are utilized for a variety of tasks by a variety of users. One such household appliance is a water heater appliance, which may be used for storing or suppling hot water to residential and commercial properties. Conventional water heater appliances include a housing, a tank attached to the housing, and a sealed system in thermal communication with the tank to heat the tank.

A typical residential water heater holds about fifty gallons of water inside the tank (e.g., a steel reservoir tank). Other residential water heaters are known as "constant flow" water heaters and include a relatively small tank or heat-exchange pipe in which water is heated as it flows through the water heater. Many water heaters permit a consumer to set the thermostat to a temperature between 90 and 150 degrees Fahrenheit (F) (32 to 65 degrees Celsius (C)). To prevent scalding and to save energy, consumers may set the thermostat to heat the reservoir water to a temperature in a range between 120 degrees F. to 140 degrees F. (about 49 degrees C. to 60 degrees C.).

SUMMARY

Aspects and advantages of embodiments of the present disclosure will be set forth in part in the following description, or can be learned from the description, or can be learned through practice of the embodiments.

One example aspect of the present disclosure is directed to a home appliance. The home appliance may include a housing. The home appliance may further include a tank attached to the housing, and the tank may define an interior volume. The home appliance may further include a sealed system in thermal communication with the tank to heat the interior volume. The home appliance may further include a communication system. The communication system may include a modular communication device operable to communicate with a remote server associated with an energy service provider over a communication network. The modular communication device may be configured to receive one or more demand response signals from the energy service provider over the communication network. The communication system may further include a clock device configured to perform clock estimation operations to estimate a true time for the communication system. The clock device may include a real-time clock chip coupled to one or more crystal oscillators. The clock device may further include a low voltage direct-current (DC) power supply configured to supply one or more low voltage power signals to the real-time clock chip based at least in part on an operating condition of the home appliance. The communication device may further include a controller operably coupled to the modular communication device and to the clock device. The controller may be configured to operate the home appliance based at least in part on the one or more demand response signals received over the communication network.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

Figure 1:
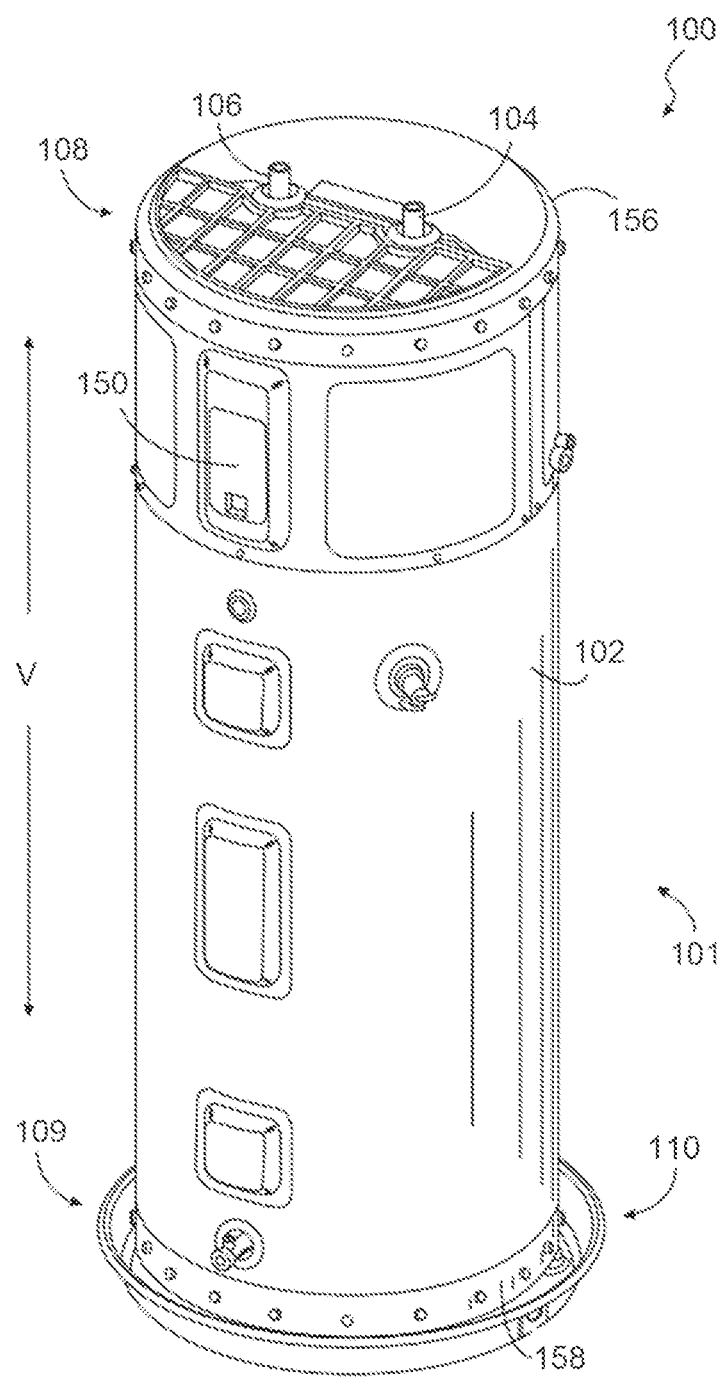
FIG. 1 depicts a perspective view of an example water heater appliance according to example embodiments of the present disclosure.

Repeat use of reference characters in the present specification and drawings is intended to represent the same and/or analogous features or elements of the present invention.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure relate to communication systems for household appliances, such as water heater appliances. In particular, example aspects of the present disclosure relate to a communication system for an appliance having a modular communication device operable to communicate with a remote server over a communication network (e.g., Wi-Fi, cellular, etc.). In this way, the modular communication device may enable the appliance to communicate with a third party (e.g., a service provider) over the communication network.

In some embodiments, the modular communication device provides demand response and energy management capabilities to the appliance. For instance, a service provider may communicate demand response signals to an appliance (via the modular communication device) to optimize energy usage in the appliance. Conventional appliances include a clock that resets when power supply to the appliance is interrupted, such as during power outages. However, energy management and demand response are not accurate and/or reliable when the appliance includes a resetting clock.

Accordingly, example embodiments of the present disclosure provide a communication system having a modular communication device and a clock device that maintains a normal operating state, even during power interruptions and communication interruptions. More particularly, the communication system includes a modular communication device operable to communicate with a remote server over a communication network. In some embodiments, the modular communication device is configured to receive demand response signals from an energy service provider over the communication network. It should be noted that, as used herein, "demand response signal(s)" refers to signals received from a remote server for energy management and/or demand response purposes.

The communication system further includes a clock device configured to perform clock operations. In particular, the clock device is configured to estimate a true time for the communication system using one or more oscillators, such as crystal oscillators. As noted above, for energy management and demand response to be accurate and reliable, the clock device must maintain its ability to perform clock operations in the absence of grid power. Thus, the clock device may include a low voltage direct-current (DC) power supply configured to supply low voltage power signals to the real-time clock chip in the absence of grid power.

In some embodiments, the low voltage DC power supply may be a battery. Batteries, however, get depleted with increased sensing frequency. Accordingly, a clock device according to the present disclosure further includes a voltage sense circuit communicatively coupled to a controller and to the battery. The voltage sense circuit may be configured to send periodic voltage sense signals to the battery for low voltage detection.

When grid power is available to the appliance (e.g., normal operation), the battery may be disconnected after determining the battery has sufficient voltage (e.g., a low battery fault condition does not exist). Conversely, when grid power is not available (e.g., during a power outage), the battery may provide sufficient power to the clock device to allow the clock device to maintain normal operations. Furthermore, when grid power is restored, a trim register in the clock device may be used to adjust the clock time based on the true network time.

Example aspects of the present disclosure provide numerous technical effects and benefits. For instance, example aspects of the present disclosure provide a communication system having a clock device that maintains its normal operating state in the absence of grid power, thereby enabling timely energy management and demand response in synchronization with the electrical supply grid. Furthermore, communication systems according to the present disclosure include a clock device that is self-calibrating and includes a real-time clock chip coupled to a low voltage DC power supply. In this way, example aspects of the present disclosure provide a clock device that estimates true time (e.g., using crystal oscillators) in the absence of external communication and/or external power supply.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (e.g., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "coupled," "fixed," "attached to," and the like refer to both direct coupling, fixing, or attaching, as well as indirect coupling, fixing, or attaching through one or more intermediate components or features, unless otherwise specified herein.

Except as explicitly indicated otherwise, recitation of a singular processing element (e.g., "a controller," "a processor," "a microprocessor," etc.) is understood to include more than one processing element. In other words, "a processing element" is generally understood as "one or more processing element." Furthermore, barring a specific statement to the contrary, any steps or functions recited as being performed by "the processing element" or "said processing element" are generally understood to be capable of being performed by "any one of the one or more processing elements." Thus, a first step or function performed by "the processing element" may be performed by "any one of the one or more processing elements," and a second step or function performed by "the processing element" may be performed by "any one of the one or more processing elements and not necessarily by the same one of the one or more processing elements by which the first step or function is performed." Moreover, it is understood that recitation of "the processing element" or "said processing element" performing a plurality of steps or functions does not require that at least one discrete processing element be capable of performing each one of the plurality of steps or functions.

Figure 2:
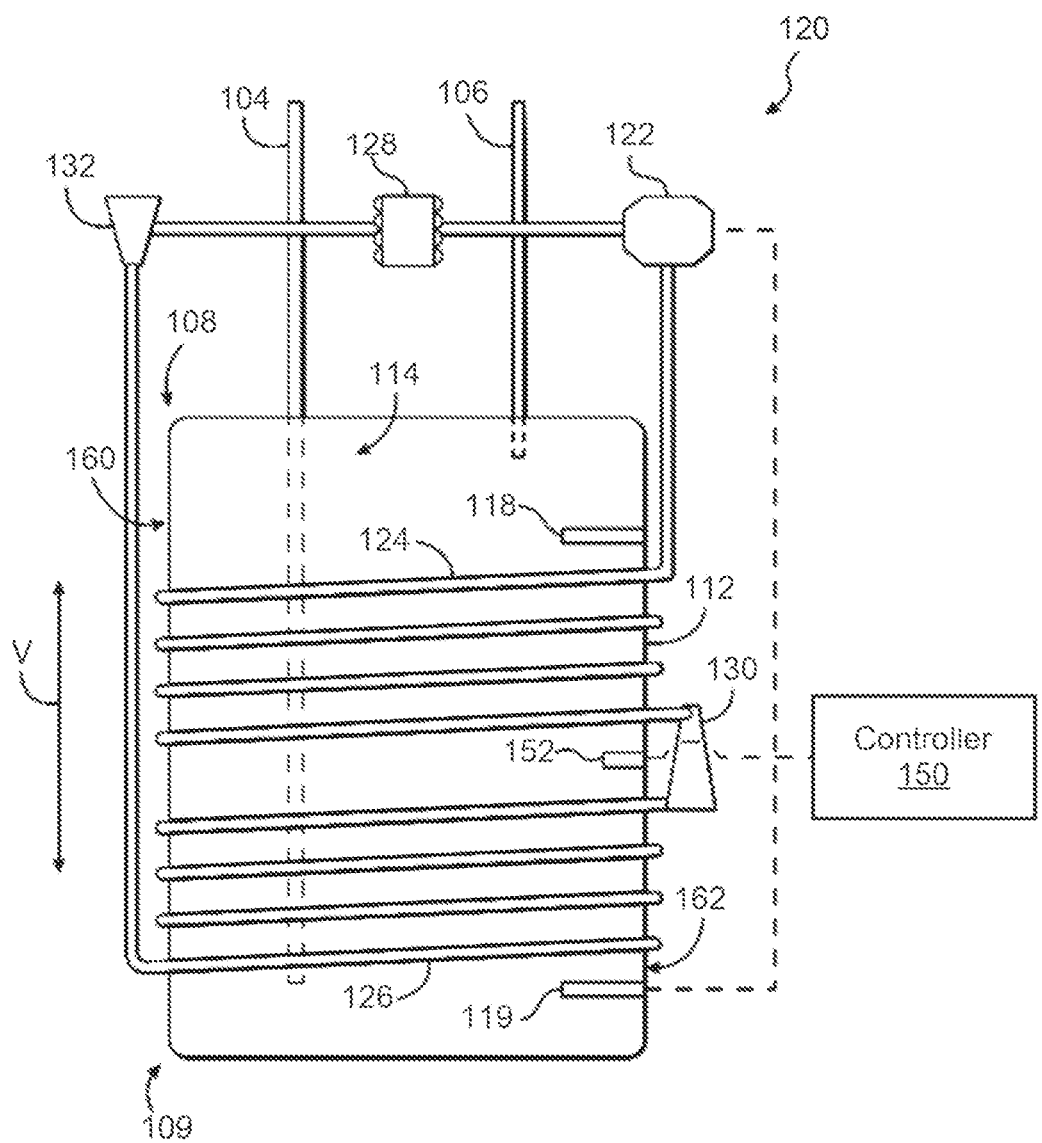
FIG. 2 depicts a schematic view of certain components of the example water heater appliance of FIG. 1 according to example embodiments of the present disclosure.

FIG. 1 provides a perspective view of a water heater appliance 100 according to an exemplary embodiment of the present subject matter. Generally, water heater appliance 100 has a housing 101 that includes an outer shell or casing 102. Casing 102 generally attaches to (e.g., surrounds) a tank 112 (FIG. 2). In some embodiments, tank 112 is disposed within casing 102. Housing 101 or casing 102 may be formed from a variety of components. As illustrated, casing 102 may include a wrapper 154 and one or more covers, such as a top cover 156 and a bottom cover 158 as illustrated. Covers 156, 158 may be fastened or coupled to wrapper 154 to form casing 102.

Turning briefly to FIG. 2, FIG. 2 provides a schematic view of certain components of water heater appliance 100. Further attached to or positioned within casing 102 is a heating assembly for heating water within tank 112. The heating assembly may include an upper or lower heating element 118, 119. Additionally or alternatively, the heating assembly may include a sealed system 120 (i.e., refrigeration system including a sealed refrigeration loop). The sealed system 120 may be in thermal communication with the tank 112 to heat an interior volume 114 defined by the tank 112. Upper and lower heating elements 118, 119 can be any suitable heating elements. For example, upper heating element 118 or lower heating element 119 may be an electric resistance element, a microwave element, an induction element, or any other suitable heating element or combination thereof. Lower heating element 119 may also be a gas burner. As will be understood by those skilled in the art and as used herein, the term "water" includes purified water and solutions or mixtures containing water and, for example, elements (such as calcium, chlorine, and fluorine), salts, bacteria, nitrates, organics, and other chemical compounds or substances.

Returning generally to FIGS. 1 and 2, water heater appliance 100 may include an inlet or cold water conduit 104 and an outlet or hot water conduit 106. Both conduits 104, 106 may be in fluid communication with a chamber or interior volume 114 (FIG. 2) defined by tank 112. As an example, cold water from a water source (e.g., a municipal water supply or a well) can enter water heater appliance 100 through cold water conduit 104. From cold water conduit 104, such cold water can enter interior volume 114 of tank 112 wherein it is heated with heating elements 118, 119 or sealed system 120 to generate heated water. Such heated water can exit water heater appliance 100 at hot water conduit 106 and, for example, be supplied to a bath, shower, sink, or any other suitable feature.

In exemplary embodiments, water heater appliance 100 extends longitudinally between a top portion 108 and a bottom portion 109 along a vertical direction V. Thus, water heater appliance 100 is generally vertically oriented. Water heater appliance 100 can be leveled (e.g., such that casing 102 is plumb in the vertical direction V) in order to facilitate proper operation of water heater appliance 100. A drain pan 110 is positioned at bottom portion 109 of water heater appliance 100 such that water heater appliance 100 sits on drain pan 110. Drain pan 110 sits beneath water heater appliance 100 along the vertical direction V (e.g., to collect water that leaks from water heater appliance 100 or water that condenses on an evaporator 128 of water heater appliance 100). It should be understood that water heater appliance 100 is provided by way of example only and that the present subject matter may be used with any suitable water heater appliance, including for example a heat pump water heater appliance.

As may be seen in FIG. 2, water heater appliance 100 may include sealed system 120 for heating water within interior volume 114 of tank 112. Sealed system 120 generally operates in a heat pump cycle. Thus, water heater appliance 100 is commonly referred to as a "heat pump water heater appliance." Water heater appliance 100 may additionally include one or more auxiliary heating elements, such as upper heating element 118 or lower heating element 119.

Sealed system 120 may include a compressor 122, one or more condensers (e.g., a first condenser 124 and a second condenser 126), and an evaporator 128. Compressor 122 or evaporator 128 of sealed system 120 may be disposed within casing 102 at top portion 108 of water heater appliance 100. As is generally understood, various conduits may be utilized to flow refrigerant between the various components of sealed system 120. Thus, for example, evaporator 128 may be between and in fluid communication with second condenser 126 and compressor 122. During operation of sealed system 120, refrigerant may flow from evaporator 128 through compressor 122. For example, refrigerant may exit evaporator 128 as a fluid in the form of a superheated vapor or high quality vapor mixture. Upon exiting evaporator 128, the refrigerant may enter compressor 122. Compressor 122 may be operable to compress the refrigerant. Accordingly, the pressure and temperature of the refrigerant may be increased in compressor 122 such that the refrigerant becomes a superheated vapor.

Each condenser 124, 126 may be assembled in a heat exchange relationship with tank 112 in order to heat water within interior volume 114 of tank 112 during operation of sealed system 120. First condenser 124 may be positioned downstream of and in fluid communication with compressor 122, and may be operable to heat the water within interior volume 114 using energy from the refrigerant. For example, the superheated vapor from compressor 122 may enter first condenser 124 wherein it transfers energy to the water within tank 112 and condenses into a saturated liquid or liquid vapor mixture. Second condenser 126 may be positioned downstream of and in fluid communication with first condenser 124, and may additionally be operable to heat the water within interior volume 114 using energy from the refrigerant, such as by further condensing the refrigerant.

Sealed system 120 may also include a first throttling device 130 between first condenser 124 and second condenser 126, or a second throttling device 132 between second condenser 126 and evaporator 128. Refrigerant, which may be in the form saturated liquid vapor mixture, may exit first condenser 124 and travel through first throttling device 130 before flowing through second condenser 126. First throttling device 130 may generally expand the refrigerant, lowering the pressure and temperature thereof. The refrigerant may then be flowed through second condenser 126. Similarly, refrigerant, which may be in the form of high quality/saturated liquid vapor mixture, may exit second condenser 126 and travel through second throttling device 132 before flowing through evaporator 128. Second throttling device 132 may generally expand the refrigerant, lowering the pressure and temperature thereof. The refrigerant may then be flowed through evaporator 128.

First or second throttling device 130, 132 may be any suitable component(s) s for generally expanding the refrigerant. For example, in some exemplary embodiments, first and second throttling device 130, 132 may be a Joule-Thomson expansion valve, also known as a "J-T valve." In other exemplary embodiments, first and second throttling device 130, 132 may be an ejector. In still other exemplary embodiments, a capillary tube, fixed orifice, or other suitable apparatus may be utilized as first and second throttling device 130, 132.

Water heater appliance 100 may additionally include a temperature sensor 152. Temperature sensor 152 may be configured for measuring a temperature of water within interior volume 114 of tank 112. Temperature sensor 152 can be positioned at any suitable location within water heater appliance 100. For example, temperature sensor 152 may be positioned within interior volume 114 of tank 112 or may be mounted to tank 112 outside of interior volume 114 of tank 112. Temperature sensor 152 may further be positioned within upper portion 160 or lower portion 162. When mounted to tank 112 outside of interior volume 114 of tank 112, temperature sensor 152 can be configured for indirectly measuring the temperature of water within interior volume 114 of tank 112. For example, temperature sensor 152 can measure the temperature of tank 112 and correlate the temperature of tank 112 to the temperature of water within interior volume 114 of tank 112. Temperature sensor 152 may be any suitable temperature sensor. For example, temperature sensor 152 may be a thermocouple or a thermistor.

In some embodiment, water heater appliance 100 further includes a controller 150 that regulates operation of water heater appliance 100. Controller 150 may be, for example, in operative communication with sealed system 120 (such as compressor 122, or other components thereof), auxiliary heating elements, or temperature sensor 152. Thus, controller 150 can selectively activate system 120 or auxiliary heating elements in order to heat water within interior volume 114 of tank 112.

In certain embodiments, controller 150 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. During use, the processor executes programming instructions stored in the memory. The memory can be a separate component from the processor or can be included onboard within the processor. Alternatively, controller 150 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Generally, controller 150 may be mounted at any suitable location on or within housing 101. In particular, at least one electronics board (e.g., such as a control board, circuit, MOSFET, or inverter board of controller 150) may be housed or mounted within top cover 156, as will be described in greater detail below.

Controller 150 may further include a user interface panel 151 through which a user may select various operational features and modes and monitor the operation of the water heater appliance. In one embodiment, the user interface panel 151 may represent a general purpose I/O ("GIPO") device or functional block. In one embodiment, the user interface panel 151 may include input components, such as one or more of a variety of electrical, mechanical, or electro-mechanical input devices including rotary dials, push buttons, and touch pads. The user interface panel 151 may include a display component, such as a digital or analog display device designed to provide operational feedback to a user. The user interface panel 151 may be in communication with the controller 150 via one or more signal lines or shared communication busses.

In some embodiments, water heater appliance 100 may further be communicatively coupled to a network (e.g., network 300 (FIG. 3)) for sending and/or receiving information. The network may be any type of communication network. For example, the network can include one or more of a wireless network, a wired network, a personal area network, a local area network, a wide area network, the internet, etc. Controller 150 may be used to establish communications with the network. As such, controller 150 may include a communications module to facilitate communications between the appliance 100 and the network. For instance, a communications module of the controller 150 may serve as an interface to permit the water heater appliance 100 to transmit a service request, a notification of a condition to a user, diagnostic information, or to receive information, such as a command to adjust an operating parameter of the water heater appliance 100.

Figure 3:
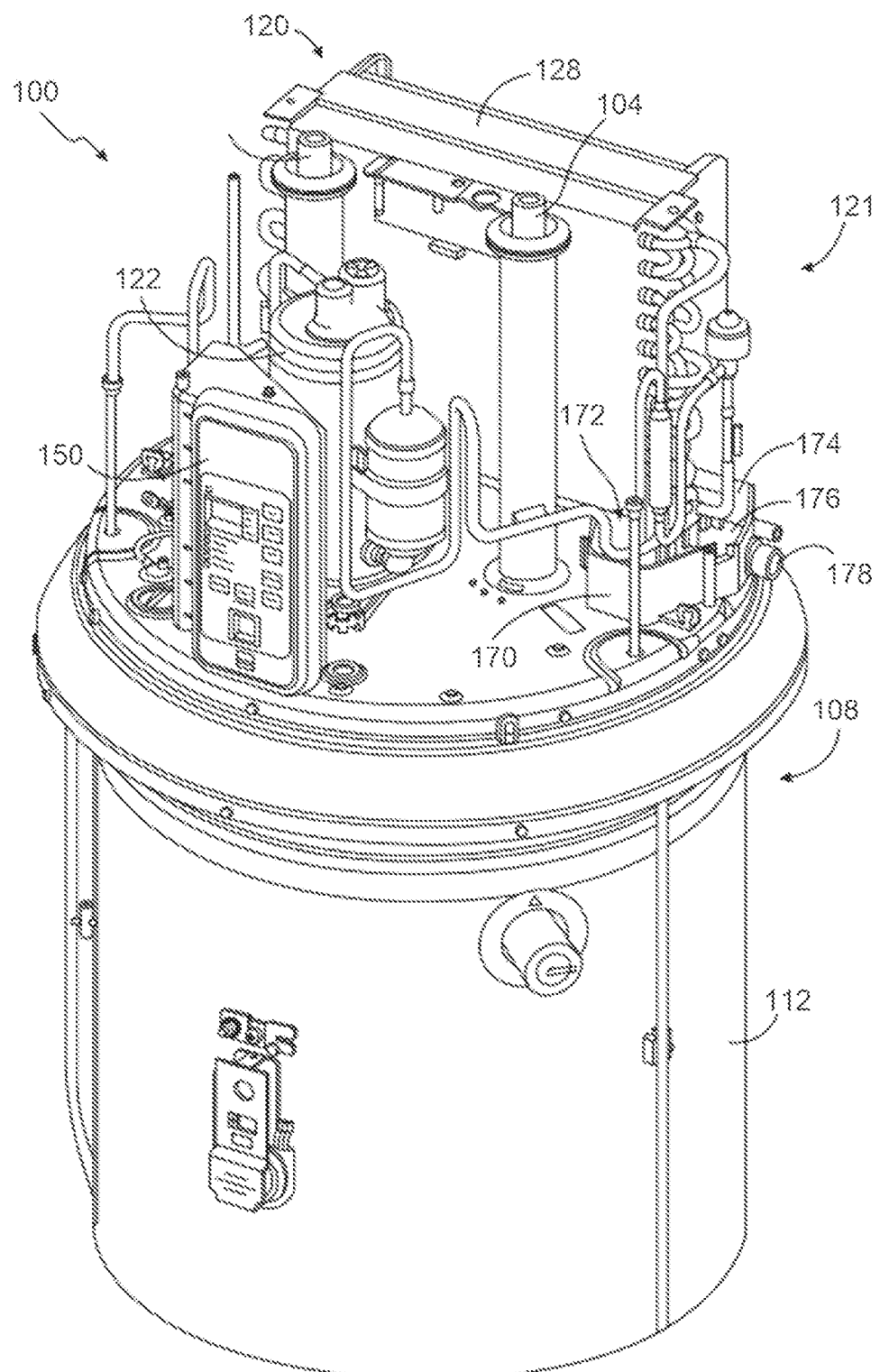
FIG. 3 depicts a partial perspective view of certain components of the example water heater appliance of FIG. 1 according to example embodiments of the present disclosure.

FIG. 3 provides a partial perspective view of certain components of water heater appliance 100. As may be seen in FIG. 3, water heater appliance 100 may include a drain pan 170. For instance, drain pan 170 may be positioned below evaporator 128 of sealed system 120. In particular, drain pan 170 may be positioned for receiving liquid runoff from evaporator 128 of sealed system 120. Thus, during a defrost cycle of sealed system 120, frost buildup on evaporator 128 may melt, and liquid runoff may flow to and collect within drain pan 170. Drain pan 170 may be positioned within casing 102. In some embodiments, both evaporator 128 and drain pan 170 are be disposed within the casing 102 (e.g., at or adjacent top portion 108 of casing 102, such as within the top cover 156-FIG. 1).

Drain pan 170 may define a collection volume 172 for receiving and collecting liquid runoff from evaporator 128. Collection volume 172 may be positioned directly below at least a portion of evaporator 128 or above (e.g., directly above) tank 112. Drain pan 170 may include a side wall 174 and a bottom wall 176 that assist with defining collection volume 172. In some embodiments, side wall 174 is mounted to and extends about bottom wall 176. Side wall 174 may also extend upwardly from bottom wall 176. Side wall 174 or bottom wall 176 may include a drain line coupling 178. Drain line coupling 178 is configured for engaging a drain line (not shown), such as a pipe or hose. The drain line may receive liquid from collection volume 172 of drain pan 170 and direct the liquid out of and away from drain pan 170. Drain line coupling 178 may be threaded in order to assist with mounting the drain line to drain line coupling 178. As another example, the drain line may be adhered or fastened to drain line coupling 178.

Figure 4:
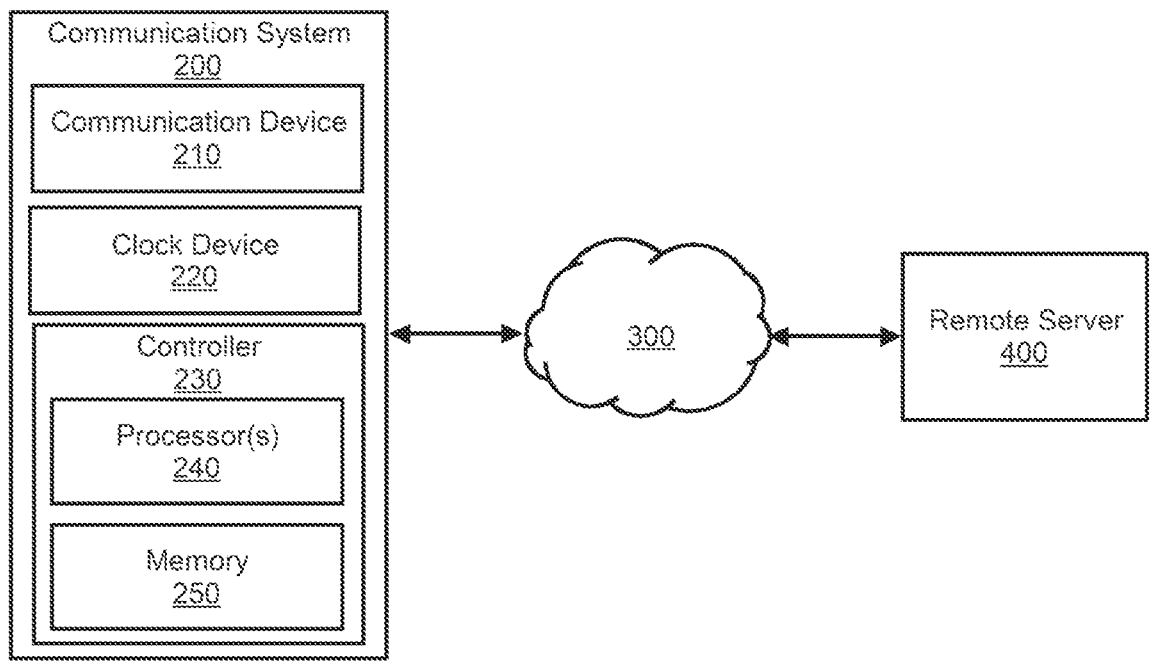
FIG. 4 depicts a block diagram of an example communication system according to example embodiments of the present disclosure.

FIG. 4 depicts a block diagram of an example communication system 200 according to example embodiments of the present disclosure. Communication system 200 may be used in a variety of home appliances, such as the water heater appliance 100 discussed above with reference to FIGS. 1-3. In other embodiments, communication system 200 may be used in other appliances, such as an air conditioner appliance. However, those having ordinary skill in the art, using the disclosure provided herein, will appreciate that communication system 200 may be used in any suitable appliance without deviating from the scope of the present disclosure.

Communication system 200 may include a modular communication device 210. The modular communication device 210 may be operable to communicate with a remote server 400 over a communication network 300. Communication network 300 may be any suitable communication network having any suitable communication protocol, such as a Wi-Fi network, local area network (LAN), cellular network (e.g., 4G, 5G, etc.). Furthermore, remote server 400 may be associated with a third party entity, such as an energy service provider and/or appliance manufacturer. For instance, in some embodiments, the modular communication device 210 may be configured to receive one or more demand response signals from the remote server 400, which may be associated with an energy service provider. Additionally and/or alternatively, the modular communication device 210 may also receive one or more time signals, such as network time signals indicating a true time, over the communication network 300.

Communication system 200 may further include a clock device 220. Clock device 220 may be communicatively coupled to the modular communication device 210. Furthermore, as will be discussed in greater detail below, the clock device 220 may be configured to perform clock estimation operations for the appliance 100. For instance, the clock device 220 may estimate a true time for the communication system 200, which allows the communication system 200 to maintain operations during a variety of interruption conditions, such as power interruption conditions and/or network interruption conditions.

More particularly, a power interruption condition may be characterized by an interruption in a power supply from a mains power source. In other words, clock device 220 may perform the clock estimation operations in situations where the appliance 100 is not receiving power signals from the energy grid. Furthermore, a network interruption condition may be characterized by an interruption in a connection between the modular communication device 210 and the communication network 300.

Clock device 220 may estimate and store a chip time value for use by the communication system 200 and the appliance 100. It should be noted that, as used herein, the chip time value estimated and stored by the clock device 220 is hereinafter referred to as the "chip time parameter." Furthermore, as will be discussed in greater detail below with reference to FIG. 7, the clock device 220 may be configured to calibrate the chip time parameter associated with the clock estimation operations based at least in part on a clock offset. The clock offset corresponds to a comparison between the chip time parameter and the network time signal received by the modular communication device 210 over the communication network 300.

The communication system may further include a controller 230. As discussed above, in certain embodiments, controller 230 includes memory 250 and one or more processing devices (e.g., processors 240), such as microprocessors, CPUs or the like, such as general or special purpose microprocessors operable to execute programming instructions or micro-control code associated with operation of communication system 200. The memory 250 can represent random access memory such as DRAM, or read only memory such as ROM or FLASH. During use, the processor 240 executes programming instructions stored in the memory. The memory 250 can be a separate component from the processor 240 or can be included onboard within the processor 240. Alternatively, controller 230 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

As will be discussed in greater detail below, the controller 230 may be operably coupled to the modular communication device 210 and to the clock device 220. The controller 230 may be configured to operate the appliance 100 based at least in part on one or more demand response signals received over the communication network 300. For instance, the remote server 400, which may be associated with an energy service provider of the appliance 100, may send the communication system 200 one or more demand response signals over the communication network 300, and the controller 230 may operate the appliance 100 based at least in part on those one or more demand response signals.

Figure 5:
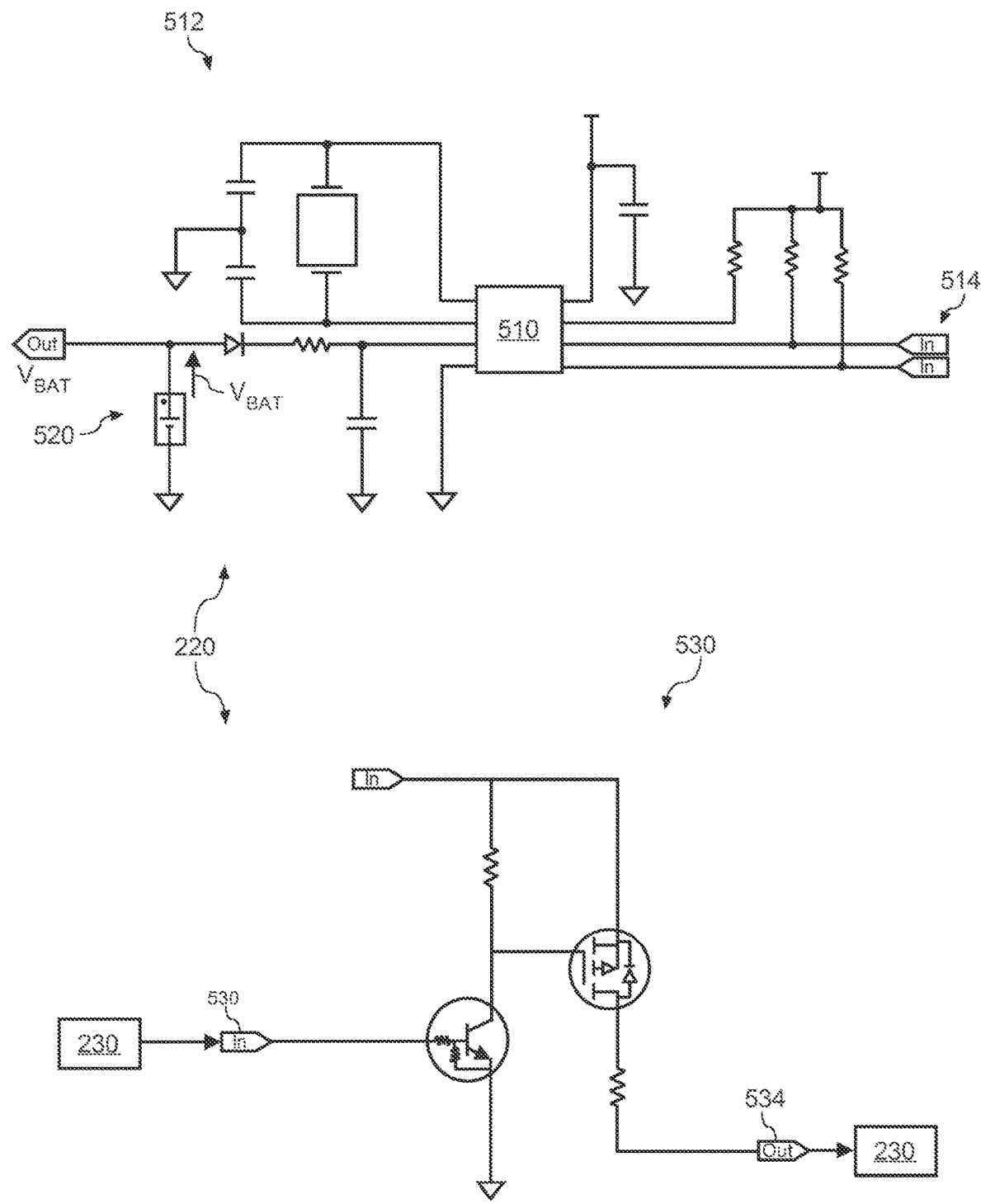
FIG. 5 depicts an example clock device of the communication system of FIG. 4 according to example embodiments of the present disclosure.

FIG. 5 depicts an example clock device 220 of the communication system 200 depicted in FIG. 4 according to example embodiments of the present disclosure. As shown, the clock device 220 may include a real-time clock chip 510. The real-time clock chip 510 may be coupled to one or more oscillators 512. In some embodiments, the one or more oscillators 512 may be crystal oscillators. For instance, the one or more oscillators 512 may be crystal oscillators having a characteristic frequency of, approximately, 32.768 kHz. Furthermore, as noted above, clock device 220 may perform clock estimation operations to estimate a true time for the communication system 200 (FIG. 4). In particular, real time clock chip 510 may estimate the true time for the appliance 100 (FIGS. 1-4) using the oscillators 512. In this way, clock device 220 may perform clock operations for the appliance 100 independent of any other clock device (not shown) present in the appliance 100.

As noted above, communication system 200 includes a modular communication device 210 (FIG. 4) which may be configured to, amongst other things, receive a network time signal over the communication network 300 (FIG. 4). In such instances, modular communication device 210 may communicate one or more system clock signals 514 indicative of the network time signal to the real time clock chip 510. In response to receiving the one or more clock signals 514, real time clock chip 510 may adjust the (estimated) chip time parameter based on the received clock signals 514 in order to synchronize the clock device 220 with the appliance 100 (FIGS. 1-4), the communication network 300, and the remote server 400 (FIG. 4). In this manner, clock device 220 may adjust its stored clock time parameter whenever a system time update is received by the modular communication device 210.

As noted above, for energy management and demand response to be effective and reliable, clock device 220 must maintain its clock capabilities despite the operating condition of the appliance 100. Thus, clock device 220 further includes a low voltage direct-current (DC) power supply 520 operable to provide supplemental power to the clock device 220. In some embodiments, such as that depicted in FIG. 5, the low voltage DC power supply may be a battery. However, those having ordinary skill in the art, using the disclosures provided herein, will understand that any suitable low voltage DC power supply may be used without deviating from the scope of the present disclosure.

Low voltage DC power supply 520 may be configured to supply one or more low voltage power signals VBAT to the real-time clock chip 510. The low voltage DC power supply 520 may supply the one or more low voltage power signals VBAT to the real-time clock chip 510 based at least in part on an operating condition of the appliance 100. For instance, as will be discussed in greater detail below, the low voltage power signals VBAT provided by the low voltage DC power supply 520 allows the clock device 220 to continue the clock estimation operations for the communication system 200 during conditions such as, e.g., power interruption conditions and/or network interruption conditions. More particularly, as will be discussed in greater detail below, a power interruption condition of the appliance 100 is characterized as an interruption in a power supply from a mains power source (e.g., power from the electrical grid). Furthermore, a network interruption condition is characterized as an interruption in a connection between the modular communication device 210 (FIG. 4) and the communication network 300 (FIG. 4).

Capacity of low voltage DC power supply 520 is quickly depleted with increased sensing frequency. Thus, clock device 220 further includes a voltage sense circuit 530 to send periodic voltage sense signals for low voltage detection. Voltage sense circuit 530 may be communicatively coupled to the low voltage DC power supply 520 and to the controller 230. For instance, voltage sense circuit 530 may receive a control signal 532 from the controller 230. The control signal 532 may include instructions causing the voltage sense circuit 530 to initiate a voltage sense operation. In response, the voltage sense circuit 530 may send periodic voltage sense signals to the low voltage DC power supply 520 to determine whether a DC fault condition (e.g., low capacity levels) exists in the low voltage DC power supply 520. The voltage sense operations performed by the clock device 220 are discussed in greater detail below with reference to FIG. 8. Furthermore, following the voltage sense operation, voltage sense circuit 530 may provide one or more feedback signals (e.g., one or more voltage sense signals 534) to the controller 230 that are indicative of an operating state of the low voltage DC power supply 520.

Figure 6:
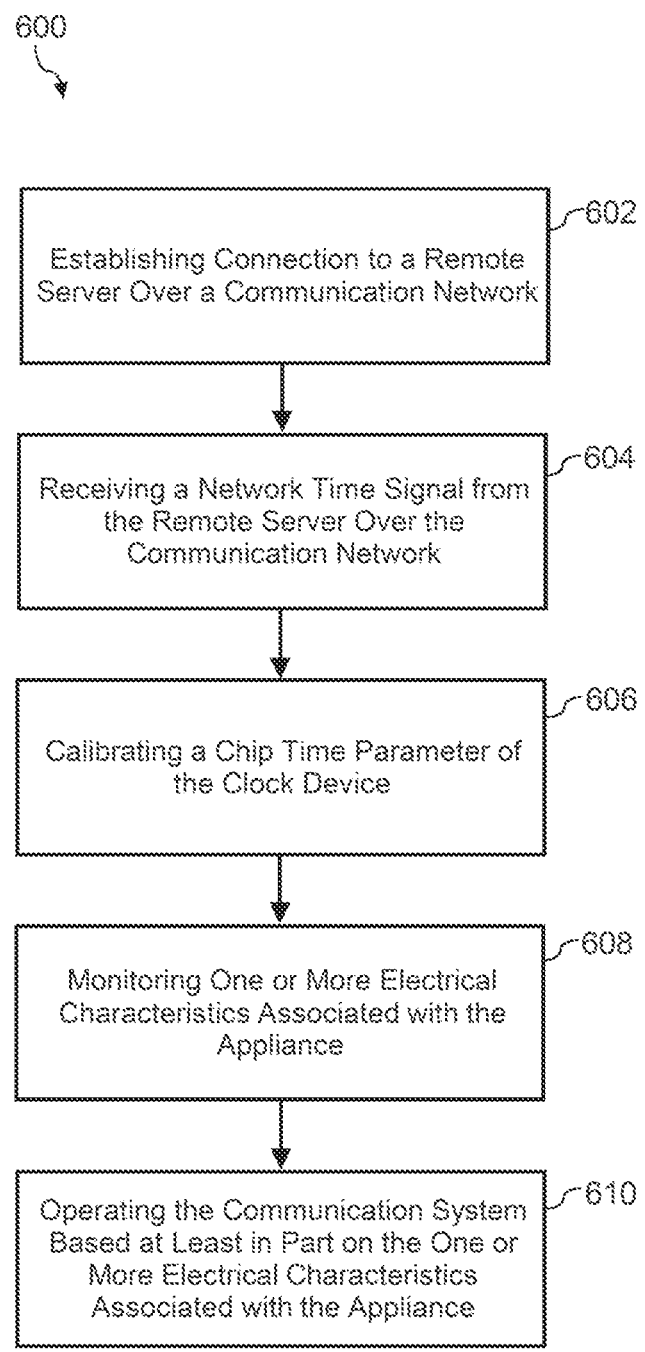
FIG. 6 depicts a flow chart diagram of an example method for operating an appliance according to example embodiments of the present disclosure.

FIG. 6 depicts a flow diagram of an example method 600 for operating a communication system of an appliance, such as a water heater appliance, according to example embodiments of the present disclosure. More particularly, method 600 can be implemented in a communication system (e.g., communication system 200) of any suitable appliance (e.g., appliance 100). FIG. 6 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. Furthermore, various steps (not illustrated) can be performed without deviating from the scope of the present disclosure. Additionally, method 600 is generally discussed with reference to the appliance 100 described above with reference to FIGS. 1-3 and the communication system 200 described above with reference to FIGS. 4-5. However, it should be understood that aspects of the present method 600 can find application with any suitable communication system of any suitable appliance.

The method 600 may include, at (602), establishing, via a communication system of the appliance, connection to a remote server over a communication network to enable communication between the appliance and an energy service provider. More particularly, modular communication device 210 may establish a connection with the remote server 400 over communication network 300. As noted above, in some embodiments, the remote server 400 may be associated with an energy service provider of the appliance 100. Thus, modular communication device 210 may enable communications between the appliance 100 and the energy service provider (e.g., remote server 400) over the communication network 300.

The method 600 may include, at (604), receiving, via the communication system, a network time signal from the remote server over the communication network. More particularly, modular communication device 210 may receive a signal over the communication network 300 that indicates a true network time. In some embodiments, in response to receiving the network time signal from the remote server, a controller (e.g., controller 230) may set a system time parameter of the communication system 200 based at least in part on the network time signal received over the communication network 300.

The method 600 may include, at (606), calibrating, via a clock device of the communication system, a chip time parameter of the clock device based at least in part on the network time signal. More particularly, the communication system 200 may include a clock device (e.g., clock device 220) operable to perform clock estimation operations for the communication system 200. In this manner, clock device 220 may estimate a true time for the communication system 200 and store said estimate as a clock time parameter. Furthermore, in instances where a network time signal is provided to the modular communication device 210, the clock device 220 may calibrate the chip time parameter based at least in part on the network time signal.

Figure 7:
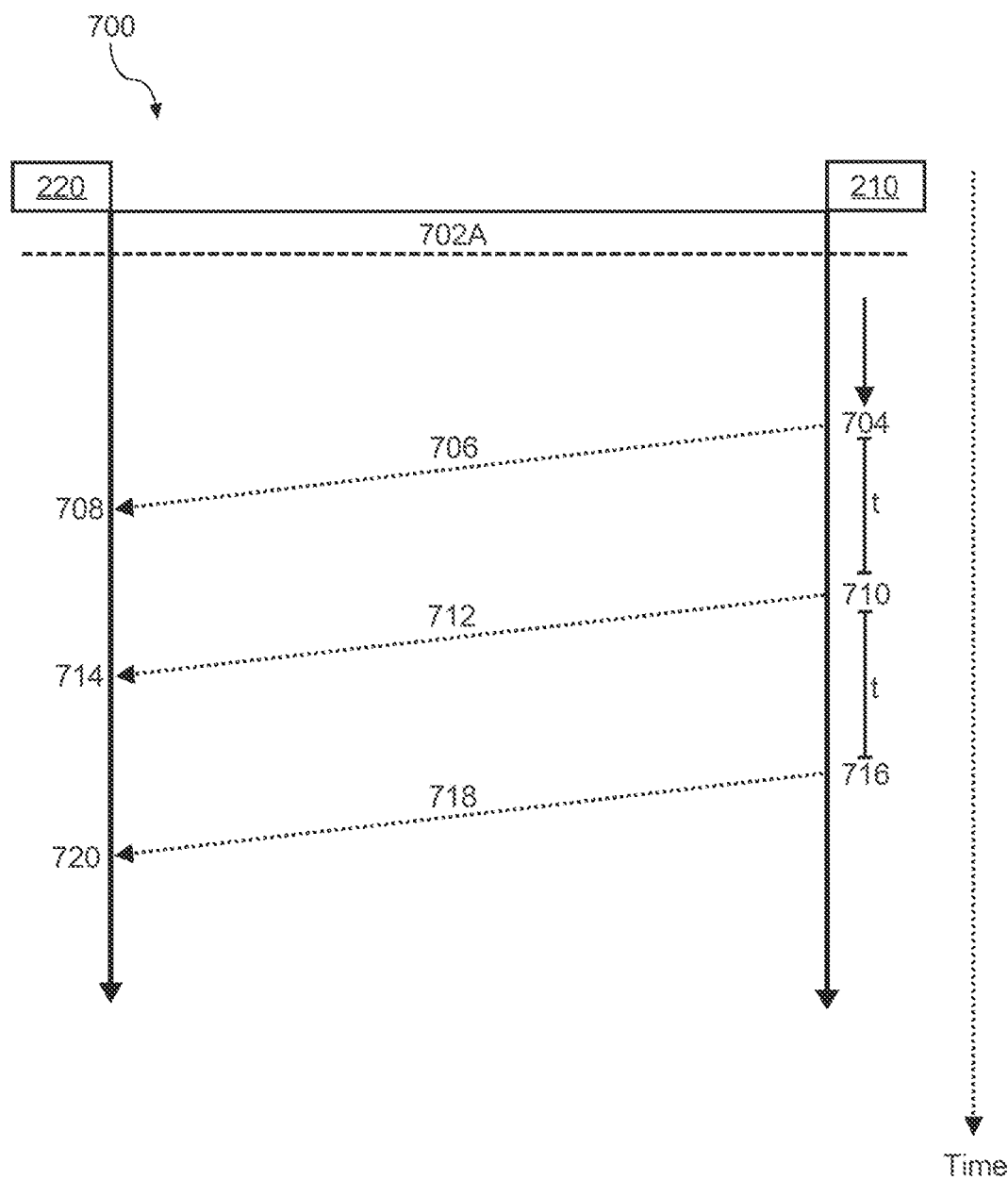
FIG. 7 depicts a ladder diagram of an example calibration operation according to example embodiments of the present disclosure.

As an illustrative example, FIG. 7 depicts a ladder diagram of an example calibration operation 700 of the clock device 220 according to example embodiments of the present disclosure. It should be understood that the example calibration method 700 is discussed with reference to the appliance 100 (FIGS. 1-3) and the communication system 200 (FIGS. 4-5).

At (702), the communication system 200 is turned on (e.g., "powered up"). Prior to startup, the clock device 220 of the communication system 200 is not operating and is not performing voltage monitoring operations. Hence, clock device 220 is not performing any clock estimation operations prior to startup at (702). Furthermore, following startup at (702), the modular communication device 210 establishes a connection to the communication network 300, thereby enabling communications between the appliance 100 and the remote server 400.

At (704), the communication system 200 may request a network time from the remote server 400. In response, the remote server 400 may send a network time signal over the communication network 300. More specifically, the modular communication device 210 may receive a network time update signal from the remote server 400 over the communication network 300.

At (706), in response to receiving the network time signal from the remote server 400, the modular communication device 210 may provide the network time signal to the clock device 220.

At (708), the clock device 220 may receive the network time signal from the modular communication device 210. In response, the clock device 220 may set a chip time parameter based at least in part on the network time signal provided over the communication network 300 by the remote server 400. Furthermore, the clock device 220 may initiate a voltage sense operation, which is discussed in greater detail below with reference to FIG. 8. Additionally, a system time parameter of the communication system 200 may be set based at least in part on the network time signal.

At (710), after a certain time period t has elapsed (e.g., three hours), the modular communication device 210 may request a network time update from the remote server 400. In response, the remote server 400 may provide a network time update signal over the communication network 300. Put differently, the modular communication device 210 may receive the network time update signal from the remote server 400 over the communication network 300.

At (712), in response to receiving the network time update signal from the remote server 400, the modular communication device 210 may provide the network time update signal to the clock device 220.

At (714), the clock device 220 may receive the network time update signal from the modular communication device 210. In response, the clock device 220 may determine a clock offset. More particularly, the clock device 220 may compare the network time update signal and the stored chip time parameter of the clock device 220. The clock offset may be based at least in part on that comparison. In response to determining the clock offset, the clock device 220 may adjust the chip time parameter of the clock device 220 based at least in part on the determined clock offset. More particularly, the clock device 220 may have one or more trim registers that are configured to increment and decrement the chip time parameter at an even rate. When the clock offset indicates the chip time parameter of the clock device 220 is slower than the system time parameter of the communication system 200, the clock device 220 may increment the chip time parameter (via the trim register). Conversely, when the clock offset indicates the chip time parameter of the clock device 220 is faster than the system time parameter of the communication system 200, the clock device 220 may decrement the chip time parameter (via the trim register).

The communication system 200 may be configured to repeat this calibration operation each time the time period t elapses (e.g., every three hours). For instance, at (716), the modular communication device 210 may request another network time update from the remote server 400. In response to receiving the network time update signal, the modular communication device 210 may, at (718), provide the network time update signal to the clock device 220. Following receipt of the network time update signal from the modular communication device 210, the clock device may, at (720), adjust the chip time parameter based at least in part on the comparison between the chip time parameter and the network time update signal (e.g., the clock offset). In this manner, the clock device 220 is configured to self-calibrate its chip time parameter, while giving priority to the system time parameter of the communication system 200.

Returning to FIG. 6, the method 600 may include, at (608), monitoring, via a controller of the communication system, one or more electrical characteristics associated with the appliance. More particularly, the controller 230 of the communication system 200 may be configured to monitor various electrical characteristics of the communication system 200. For instance, the controller 230 may monitor a supply voltage level provided to the communication system 200 by a power supply, such as a mains power supply (e.g., electrical grid). Furthermore, the controller 230 may also monitor a capacity of a low voltage DC power supply (e.g., low voltage DC power supply 520) to determine whether a DC fault condition (e.g., low capacity) exists in the low voltage DC power supply 520. It should be understood, however, that any suitable electrical characteristic associated with the communication system 200 may be monitored without deviating from the scope of the present disclosure.

Figure 8:
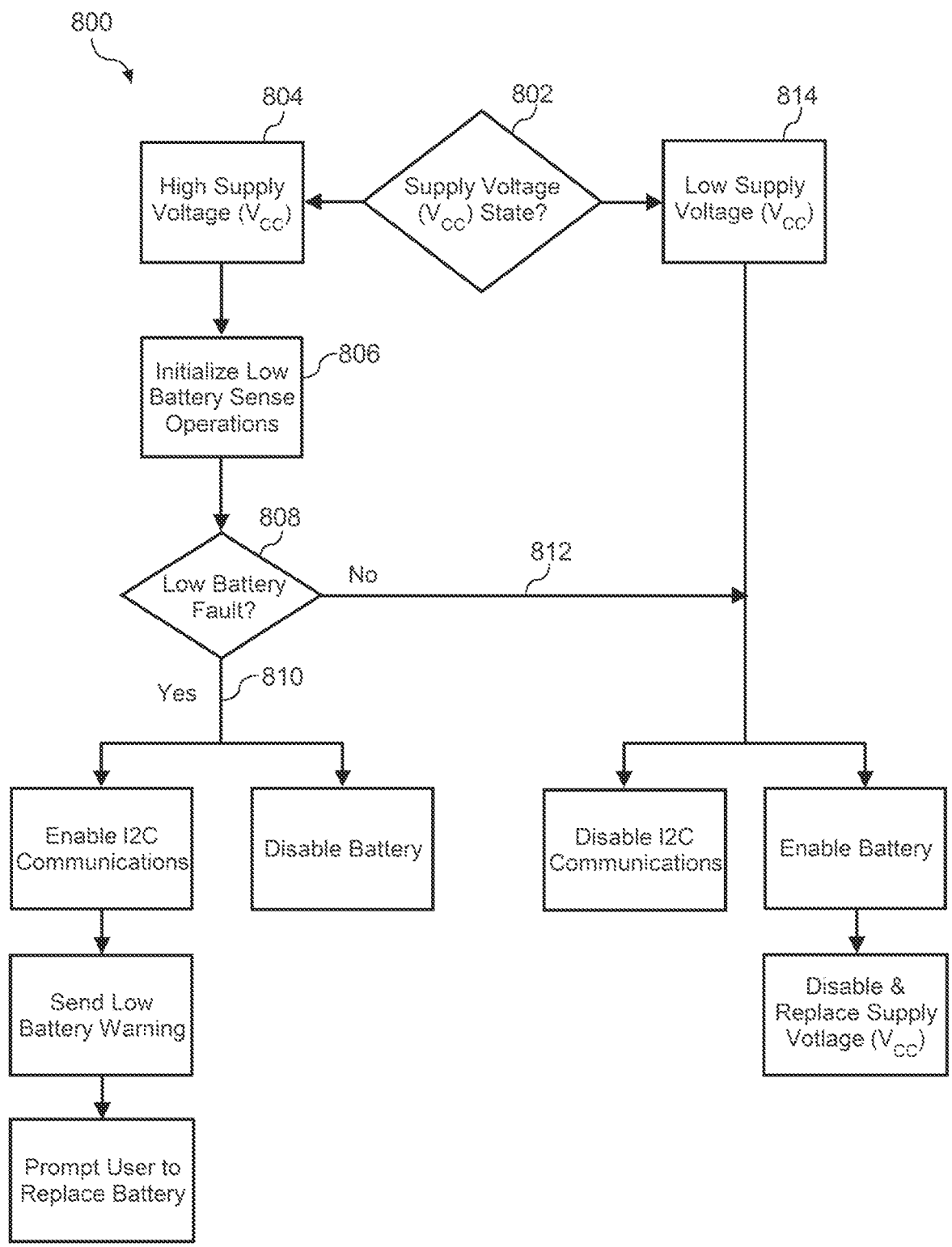
FIG. 8 depicts a decision tree of an example voltage sense operation according to example embodiments of the present disclosure.

As an illustrative example, FIG. 8 depicts a decision tree of an example voltage sense operation 800 according to example embodiments of the present disclosure. FIG. 8 depicts steps performed and decisions made in a particular order for purposes of illustration and discussion. Those having ordinary skill in the art, using the disclosures provided herein, will understand that various steps of any of the methods described herein can be omitted, expanded, performed simultaneously, rearranged, and/or modified in various ways without deviating from the scope of the present disclosure. Furthermore, various steps (not illustrated) can be performed without deviating from the scope of the present disclosure. It should be noted that the voltage sense operation 800 depicted in FIG. 8 is discussed with reference to the appliance 100 (FIGS. 1-3) and the communication system 200 (FIGS. 4-5) discussed above.

At (802), a supply voltage state of the communication system 200 may be determined based at least in part on a supply voltage provided to the communication system by a power supply (e.g., electrical grid). For instance, the communication system 200 may have a high supply voltage state (e.g., corresponding to approximately 3.3 volts) corresponding to a normal operating condition of the appliance or a low supply voltage state (e.g., corresponding to approximately 2.8 volts) corresponding to a power interruption condition of the appliance. If the communication system 200 has a high supply voltage state, the voltage sense operation 800 may proceed to (804). Conversely, if the communication system 200 has a low supply voltage state, the voltage sense operation 800 may proceed to (814).

At (806), in response to determining the communication system 200 has a high supply voltage state, the controller 230 may send a control signal to the voltage sense circuit 530 of the clock device 220. More particularly, the control signal may include instructions that cause the voltage sense circuit 530 to initiate low DC voltage sense operations. As noted above, the clock device 220 includes a low voltage DC power supply 520. It should be noted that the low voltage DC power supply 520 may be any suitable low voltage DC power supply without deviating from the scope of the present disclosure.

At (808), in response to initiating the low battery sense operations, the controller 230 may determine whether a low battery fault condition (e.g., DC fault condition). More particularly, the controller 230 may receive one or more voltage sense signals from the voltage sense circuit 530, which may be indicative of an operating state of the low voltage DC power supply 520 of the clock device 220. Furthermore, based on the voltage sense signals received from the low voltage DC power supply 520, the controller 230 may determine whether the DC power supply 520 has a sufficient amount of stored energy to provide one or more low voltage power signals to the clock device 220. In other words, the controller 230 may determine whether the low voltage DC power supply 520 has enough capacity to allow the clock device 220 to maintain clock estimation operations in the event a power interruption condition and/or a network interruption condition occurs.

If a DC fault condition exists, the voltage sense operations 800 may proceed to (810). More particularly, the clock device 220 may provide a warning signal to the controller 230, and the warning signal may indicate that the DC fault condition exists. In response to receiving the warning signal from the clock device 220, the controller may enable I2C communications in order to send a low battery warning signal to prompt a user (e.g., customer) to replace the low voltage DC power supply 530. Subsequent to prompting the user to replace the low voltage DC power supply 520, the low voltage DC power supply 520 may be disconnected to preserve the remaining energy levels (if any).

If a DC fault condition does not exist, the voltage sense operations 800 may proceed to (812). More particularly, in response to determining that the supply voltage state of the communication system 200 is the high supply voltage state at (802) and that the DC fault condition does not exist at (808), the controller 230 may disable I2C communications and disconnect the low voltage DC power supply 520 from the clock device 220.

As noted above, if the communication system has a low supply voltage state, the voltage sense operation 800 may proceed to (814). As noted above, a low supply voltage state may be indicative of a power interruption condition. More particularly, in response to determining that the supply voltage state of the communication system 200 is the low supply voltage state, the low voltage DC power supply 520 may provide one or more low voltage power signals to the real-time clock chip 510 of the clock device 220. In this manner, the low voltage DC power supply 520 enables the clock device 220 to perform clock estimation operations to estimate the true time for the communication system 200 while the communication system 200 is operating in the low supply voltage state. Once the supply voltage is restored (e.g., once the communication system 200 resumes high supply voltage state operations), the low voltage DC power supply 520 may be disconnected.

Returning to FIG. 6, the method 600 may include, at (610), operating, via the controller, the communication system based at least in part on the one or more electrical characteristics associated with the appliance. More particularly, as noted above, the one or more electrical characteristics monitored at (608) by the controller 230 may be indicative of an operating condition of the communication system 200 and the appliance 100. For instance, a power interruption condition may exist when there is an interruption in a power supply from a mains power supply (e.g., electrical grid), and the power interruption condition may be determined based at least in part on the supply voltage state determined by the controller 230. Additionally and/or alternatively, a network interruption condition may exist when there is an interruption in a connection between the modular communication device 210 and the communication network 300, and the network interruption condition may be determined based at least in part on one or more electrical characteristics associated with the modular communication device 210. Furthermore, in some embodiments, the controller 230 may be configured to operate the communication system 200 based at least in part on one or more demand signals received over the communication network 300 from the remote server 400 associated with the energy service provider. In this way, the communication system 200 provides reliable and timely energy management that is in sync with the electrical grid (e.g., mains power supply).

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of operating an appliance, the method comprising:
   establishing, via a communication system of the appliance, connection to a remote server over a communication network to enable communication between the appliance and an energy service provider;
   receiving, via the communication system, a network time signal from the remote server over the communication network;
   in response to receiving the network time signal from the remote server, setting, via a controller of the communication system, a system time parameter of the communication system based at least in part on the network time signal;
   calibrating, via a clock device of the communication system, a chip time parameter of the clock device based at least in part on a comparison between the chip time parameter and the network time signal;
   monitoring, via the controller, one or more electrical characteristics associated with the appliance; and
   operating, via the controller, the communication system of the appliance based at least in part on the one or more electrical characteristics associated with the appliance.

2. The method of claim 1, wherein calibrating the chip time parameter of the clock device comprises:
   requesting a network time update signal from the remote server;
   receiving, at a modular communication device of the communication system, the network time update signal;
   determining a clock offset based at least in part on the comparison of the network time update signal and the chip time parameter of the clock device; and
   in response to determining the clock offset, adjusting the chip time parameter of the clock device based at least in part on the clock offset.

3. The method of claim 2, wherein adjusting the chip time parameter of the clock device comprises:
   incrementing, via a trim register of the clock device, the chip time parameter when the clock offset indicates the chip time parameter is slower than the system time parameter; and
   decrementing, via the trim register, the chip time parameter when the clock offset indicates the chip time parameter is faster than the system time parameter,
   wherein the trim register is configured to increment and decrement the chip time parameter at an even rate.

4. The method of claim 1, wherein monitoring one or more electrical characteristics associated with the appliance comprises:

determining a supply voltage state of the communication system based at least in part on a supply voltage provided to the communication system by a mains power source.

5. The method of claim 4, wherein the supply voltage state of the communication system comprises a high supply voltage state and a low supply voltage state, the high supply voltage state corresponding to a normal operating condition of the appliance, and the low supply voltage state corresponding to a power interruption condition of the appliance characterized by an interruption in a power supply from the mains power source.

6. The method of claim 5, wherein the communication system further comprises a clock device, the method further comprising:
in response to determining the supply voltage state of the communication system is the high supply voltage state, sending, via the controller, a control signal to a voltage sense circuit of the clock device, the control signal comprising instructions causing the voltage sense circuit to initiate a low DC voltage sense operation;
receiving, from the voltage sense circuit, one or more voltage sense signals indicative of an operating state of a low voltage direct-current (DC) power supply of the clock device; and
determining, via the controller, whether a DC fault condition exists in the low voltage DC power supply based at least in part on the one or more voltage sense signals.

7. The method of claim 6, further comprising:
in response to receiving a warning signal from the clock device indicating a DC fault condition exists in the low voltage DC power supply, prompting a user to replace the low voltage DC power supply.

8. The method of claim 6, further comprising:
in response to determining the supply voltage state is the high supply voltage state and that a DC fault condition does not exist, disconnecting the low voltage DC power supply from the clock device.

9. The method of claim 5, wherein the communication system further comprises a clock device, the method further comprising:
in response to determining the supply voltage state of the communication system is the low supply voltage state, providing, via a low voltage direct-current (DC) power supply of the clock device, one or more low voltage power signals to a real-time clock chip of the clock device.

10. The method of claim 9, wherein the low voltage DC power supply enables the clock device to perform clock estimation operations to estimate a true time for the communication system while the communication system is operating in the low supply voltage state.

11. A communication system for an appliance, comprising:
a modular communication device operable to communicate with a remote server over a communication network, the modular communication device configured to receive one or more demand response signals and a network time signal from the remote server over the communication network;
a clock device configured to perform clock estimation operations to estimate a true time for the communication system, the clock device further configured to calibrate a chip time parameter associated with the clock estimation operations based at least in part on a clock offset, the clock offset corresponding to a comparison between the chip time parameter and the network time signal, the clock device comprising:
a real-time clock chip coupled to one or more crystal oscillators; and
a low voltage direct-current (DC) power supply configured to supply one or more low voltage power signals to the real-time clock chip based at least in part on an operating condition of the appliance; and
a controller operably coupled to the modular communication device and to the clock device, the controller configured to operate the appliance based at least in part on the one or more demand response signals received over the communication network.

12. The communication system of claim 11, wherein the clock device is configured to perform the clock estimation operations for the communication system during a power interruption condition of the appliance, the power interruption condition characterized by an interruption in a power supply from a mains power source.

13. The communication system of claim 11, wherein the clock device is configured to perform the clock estimation operations for the communication system during a network interruption condition of the appliance, the network interruption condition characterized by an interruption in a connection between the modular communication device and the communication network.

14. The communication system of claim 11, wherein the clock device comprises a trim register, the trim register configured to adjust the chip time parameter of the clock device at an even rate based at least in part on the clock offset.

15. The communication system of claim 11, wherein the clock device further comprises a voltage sense circuit communicatively coupled to the controller and to the low voltage DC power supply, the voltage sense circuit configured to send periodic voltage sense signals to the low voltage DC power supply to determine whether a DC fault condition exists in the low voltage DC power supply.

16. The communication system of claim 11, wherein the appliance is a water heater appliance.

17. A home appliance, comprising:
a housing;
a tank attached to the housing, the tank defining an interior volume;
a sealed system in thermal communication with the tank to heat the interior volume; and
a communication system, the communication system comprising:
a modular communication device operable to communicate with a remote server associated with an energy service provider over a communication network, the modular communication device configured to receive one or more demand response signals and a network time signal from the energy service provider over the communication network;
a clock device configured to perform clock estimation operations to estimate a true time for the communication system and calibrate a chip time parameter associated with the clock estimation operations based at least in part on a clock offset, the clock offset corresponding to a comparison between the chip time parameter and the network time signal, the clock device comprising:
a real-time clock chip coupled to one or more crystal oscillators; and
a low voltage direct-current (DC) power supply configured to supply one or more low voltage power signals to the real-time clock chip based at least in part on an operating condition of the home appliance; and a controller operably coupled to the modular communication device and to the clock device, the controller configured to operate the home appliance based at least in part on the one or more demand response signals received over the communication network.

18. The home appliance of claim 17, wherein the home appliance is a water heater appliance or an air conditioner appliance.

* * * * *